US00RE40739E

(19) United States
(12) Reissued Patent
Hashimoto

(10) Patent Number: US RE40,739 E
(45) Date of Reissued Patent: Jun. 16, 2009

(54) DRIVING CIRCUIT OF DISPLAY DEVICE

(75) Inventor: Yoshiharu Hashimoto, Tokyo (JP)

(73) Assignee: NEC Electronics Corporation, Kawasaki, Kanagawa (JP)

(21) Appl. No.: 11/131,473

(22) Filed: May 18, 2005

Related U.S. Patent Documents

Reissue of:
(64) Patent No.: 6,567,066
Issued: May 20, 2003
Appl. No.: 09/505,192
Filed: Feb. 16, 2000

(30) Foreign Application Priority Data

Feb. 16, 1999 (JP) ..... 11-037828

(51) Int. Cl.
*G09G 3/36* (2006.01)

(52) U.S. Cl. ..... 345/100; 345/89; 345/98; 345/690

(58) Field of Classification Search ..... 345/87–104, 345/204–251, 690
See application file for complete search history.

(56) References Cited

U.S. PATENT DOCUMENTS

| | | | | |
|---|---|---|---|---|
| 5,784,041 A | * | 7/1998 | Okada et al. | 345/89 |
| 5,929,847 A | * | 7/1999 | Yanagi et al. | 345/204 |
| 6,211,866 B1 | * | 4/2001 | Okutani | 345/209 |
| 6,297,813 B1 | * | 10/2001 | Okada et al. | 345/204 |
| 6,567,066 B1 | * | 5/2003 | Hashimoto | 345/100 |

FOREIGN PATENT DOCUMENTS

| | | |
|---|---|---|
| JP | 5-158446 | 6/1993 |
| JP | 5-249924 | 9/1993 |
| JP | 6-95623 | 4/1994 |
| JP | 7-104716 | 4/1995 |
| JP | 7-210119 | 8/1995 |
| JP | 9-251282 | 9/1997 |
| JP | 10-177371 | 6/1998 |

OTHER PUBLICATIONS

Japanese Office Action dated Aug. 13, 2001, with partial English translation.
S. Saito et al., "17.3: A 6–bit Digital Data Driver for Color TFT–LCDs", SID 95 Digest, (1995), pp. 257–260 with Abstract.*

* cited by examiner

*Primary Examiner*—Vijay Shankar
(74) *Attorney, Agent, or Firm*—McGinn IP Law Group, PLLC

(57) ABSTRACT

A driving circuit of a display device including a TFT (Thin Film Transistor) liquid crystal display device or the like is provided which is capable of decreasing a chip in size and reducing costs of testing by reducing the number of bits even in the case of increased number of bits of digital image data to perform multi-gray shade displaying. The driving circuit of the display device has a gray shade voltage generating circuit adapted to generate a plurality of voltages, gray shade voltage selecting circuits used to select one voltage out of a plurality of voltages supplied from the gray shade voltage generating circuit based on high order bits composed of one or two and more bits counted from the most significant bit of the digital image data and the number of bits of which is smaller than that of the digital image data and to output it, operational amplifiers used to convert an impedance of a voltage outputted from gray shade voltage selecting circuits and voltage adjusting circuits used to induce a voltage rise or a voltage drop in voltages outputted from the operational amplifier based on low order bit of the digital image data excluding its high order bits.

18 Claims, 12 Drawing Sheets

DRIVING CIRCUIT OF DISPLAY DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a driving circuit of display devices such as TFT (Thin Film Transistor) liquid crystal display devices and the like and more particularly to the driving circuit used to display devices, which is capable of displaying multi-shades of gray.

2. Description of the Related Art

Development of a liquid crystal display device is recently prevailing which also stimulates further development of a driving circuit used for the liquid crystal device.

A driving circuit of the display device for 6-bit 240 output digital image data is described in Society for Information Display (SID) International Symposium digest of technical papers (S. Saito and K. Kitagawa of NEC Corp. Kanagawa, Japan, Vol. XXVI, pp. 257–260, Figure 1, 1995). FIG. 11 is a schematic block diagram showing the conventional driving circuit used for display devices described in the above literature.

The conventional driving circuit is provided with a 80-bit shift register circuit 51 into which a switching signal R/L and a clock signal CLK are inputted, both of which are adapted to switch an inputting/outputting direction of a start pulse signal SP. The start pulse SP is inputted into either of a terminal SPR or a terminal SPL in accordance with the switching signal R/L and is outputted from other terminal to an adjacent driving circuit. To this shift register 51 is connected to a data register circuit 52 in which data for 6-bit 3 outputs including D00 to D05, D10 to D15 and D20 to D25 is sequentially stored. To this data register circuit is connected a data latch circuit 53 into which a latch circuit STB is inputted. A gray shade voltage generating circuit 56 is provided, which is used to divided gray shade voltages including 9 voltage values from V0 to V8 and to output one gray shade voltage. Moreover, a gray shade voltage selecting circuit 54 is provided which is used to select one gray shade voltage out of 64 gray shade voltages outputted from the gray shade voltage generating circuit 56 based on image data transferred from the data latch circuit 53. The gray shade voltage selecting circuit 54 has 64 ROM decoders. Furthermore, an amplifier 55 in which an operational amplifier is built therein is also mounted, which is used to perform an impedance conversion of signals outputted from the gray shade voltage selecting circuit 54.

In the gray shade voltage generating circuit 56, the gray shade voltages of 9 values inputted from outside are divided to generate the gray shade voltages of 64 values. Such a voltage dividing method is generally called a "resistance string method".

Moreover, the gray shade selecting circuit 54 is composed of, for example, an enhancement mode transistor and a depletion mode transistor.

In the conventional driving circuit having such configurations as described above, when the start pulse SP is inputted into the shift register circuit 51, data for 6-bit 3 outputs including D00 to D05, D10 to D15 and D20 to D25 is sequentially stored.

Next, when the latch signal STB is inputted into the data latch circuit 53, all digital image data that had been stored in the data register circuit 52 is transferred to the data latch circuit 53 and stored therein.

From the gray shade voltage generating circuit 56 is supplied gray shade voltages of 64 values to the gray shade voltage selecting circuit 54 and, when the digital image data is transferred to the data latch circuit 53, one gray shade voltage is selected out of the gray shade voltage of 64 values based on the digital image data and is outputted.

The voltage outputted from the gray shade voltage selecting circuit 54, after its impedance is converted by the operational amplifier embedded in the amplifier 55, is applied to liquid crystals implemented in the liquid crystal display device.

However, in the conventional driving circuit described above, though it is possible to generate 64 (6-bit) gray shade voltages without any problem, if gray shades exceeding 64 have to be generated, there are following various problems to be solved.

That is, according to a conventional resistance string method, as the number of shades of gray increases, a size of a chip for the gray shade selecting circuit 54 significantly increases. For example, in the case of a driver used for 65 shades of gray, the gray shade voltage selecting circuit must have 64 pieces of ROM decoders per one output while, in the case of a driver used for 256 shades of gray, the gray shade voltage selecting circuit must have 256 pieces of ROM decoders (i.e., 4 times larger than 64 ROM decoders) per one output. Therefore, if these drivers must be implemented on a semiconductor integrated circuit, a device area must be 4 times as large as that for 64 shades of gray, thus causing a significant increase in the size of the chip.

Also, in the case of the driving circuit used for 64 shades of gray, since the gray shade voltage selecting circuit 54 has 64 ROM decoders, checking of operations of all these 64 decoders is required accordingly. In the case of the driving circuit used for 256 shades of gray, it is also necessary to check operations of all 256 decoders as well. Because of this, time required for testing is increased by four times, thus increasing test time required in an inspection process in a semiconductor circuit production and resulting in increased costs for testing.

SUMMARY OF THE INVENTION

In view of the above, it is an object of the present invention to provide a driving circuit of a display device which is capable of decreasing a chip in a size and reducing cots for testing in production processes by reducing the number of devices even if the number of bits of digital image data is increased for displaying multi-shades of gray.

According to a first aspect of the present invention, there is provided the driving circuit of the display device for displaying a plurality of gray shades based on inputted digital image data including:

gray shade voltage generating means for generating a plurality of voltages;

gray shade voltage selecting means for selecting one voltage out of a plurality of voltages supplied from the gray shade voltage generating means based on high order bits composed of one or two and more bits counted from the most significant bit of the digital image data and the number of bits of which is smaller than that of the digital image data, and for outputting the voltage;

an operational amplifier used to convert an impedance of a voltage outputted from the gray shade voltage selecting means; and voltage adjusting means for inducing a voltage rise or a voltage drop of a voltage outputted from the operational amplifier based on low order bits of the digital image data excluding the high order bits.

In the foregoing, a preferable mode is one wherein the voltage adjusting means includes a resistor connected to an output terminal of the operational amplifier, an active device connected to the resistor and controlling means for controlling operations of the active device based on the low order bits.

Also, a preferable mode is one wherein the active device has a first transistor, a drain of which is connected to the resistor, a source of which supply power is applied to and a second transistor a drain of which is connected to the resistor, a source of which is connected to a ground and a gate voltage of which is controlled by the controlling means.

Also, a preferable mode is one wherein the resistor is composed of an analog switch.

Also, a preferable mode is one wherein the gray shade voltage selecting means, when values between adjacent gray shade voltages are not equal, is used to select one voltage out of a plurality of voltages fed by the gray shade voltage generating means based on all bits of the digital image data and wherein the voltage adjusting means is used to output a voltage, as it is, outputted from the operational amplifier.

According to a second aspect of the present invention, there is provided the driving circuit of the display device for displaying a plurality of gray shades based on inputted digital image data including:

gray shade voltage generating means for generating a plurality of voltages;

gray shade voltage selecting means for selecting two or more voltages out of a plurality of voltages supplied from the gray shade voltage generating means based on high order bits composed of one or two and more bits counting from the most significant bit of the digital image data and the number of bits of which is smaller than that of the digital image data;

dividing means for dividing two or more voltages outputted from the gray shade voltage selecting means and for one divided voltage based on low order bits of the digital image data excluding the high order bits; and an operational amplifier used to convert an impedance of a voltage outputted from the dividing means.

In the foregoing, it is preferable that the gray shade voltage selecting means, when values between adjacent gray shade voltages are not equal, is used to select one voltage out of a plurality of voltages supplied from the gray shade voltage generating means based on all bits of the digital image data and to output the voltage.

Also, it is preferable that the gray shade voltage generating means is provided with two or more input terminals to which an voltage is inputted from outside and with dividing means used to divide voltages inputted into the input terminals into many voltages.

Also, it is preferable that a voltage outputted from the gray shade voltage generating means is a positive polarity voltage or a negative polarity voltage.

Furthermore, it is preferable that, when the number of bits of the digital image data is N, the high order bits are composed of (N−m) bits counted from the most significant bit of the digital image data and the low order bits are composed of m bits counted from the least significant bit of the digital image data.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
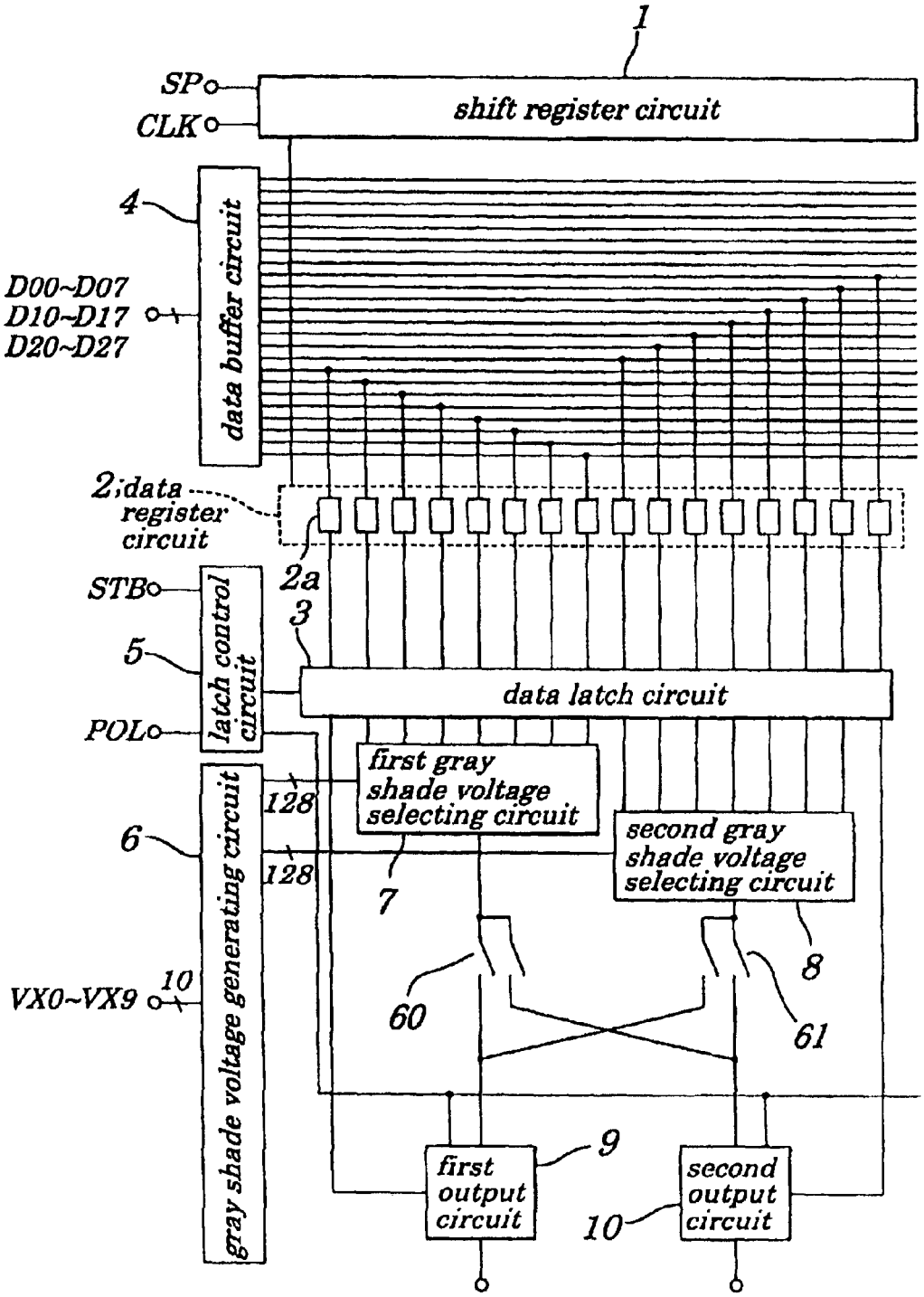
FIG. 1 is a schematic block diagram showing a driving circuit according to a first embodiment of the present invention.

In a first embodiment, 8-bit digital image data is inputted. FIG. 1 is a schematic block diagram showing a diving circuit according to the first embodiment of the present invention.

The driving circuit of the first embodiment is provided with a shift register circuit 1 into which a start pulse SP and a clock signal CLK are inputted and which is used to shift contents of the register in synchronization with the clock signal CLK. The driving circuit also has a data buffer circuit 4 used to temporarily store digital image data D00 to D07, D10 to D17 and D20 and D27 and a data register circuit 2 used to save these data. The data register circuit 2 is provided with 16 registers 2a. Moreover, the driving circuit has a data latch circuit 3 used to latch the digital image data and a latch control circuit 5 used to control operations of the data latch circuit 3. Into this latch control circuit 5 is inputted a latch control signal STB and a polarity signal POL.

In FIG. 1, signal lines extending from the data buffer circuit 4 and not being connected to the data register circuit 2 are connected to a data register circuit (not shown).

The driving circuit is further provided with a gray shade voltage generating circuit 6 used to divide gray shade voltages including 10 voltage values from V0 to V9 and to input 128 gray shade voltages having either of positive polarity or negative polarity. It is also provided with a first gray shade voltage selecting circuit 7 and a second gray shade voltage selecting circuit 8 which are adapted to select one gray shade voltage out of 128 gray shade voltage outputted from the gray shade voltage generating circuit 6 based on high order 7 bits of the digital image data transferred from the data latch circuit 3. Into the first gray shade voltage selecting circuit 7 is inputted a positive gray shade voltage and into the second gray shade selecting circuit 8 is inputted a negative gray shade voltage. Furthermore, the driving circuit is provided with a first output circuit 9 and a second output circuit 10 in which operational amplifiers are built in and an impedance of a signal outputted from the first gray shade voltage selecting circuit 8 is converted. Between the first gray shade voltage circuit 8 and the first output circuit 9/second output circuit 10 are analog switched 60, 61 used to select connections between them. The latch control signal STB and polarity signal POL are inputted into the first output circuit 9 and second output circuit 10 from the latch control circuit 5 and the least significant bit of the digital image data is inputted from the data latch circuit 3.

Figure 2:
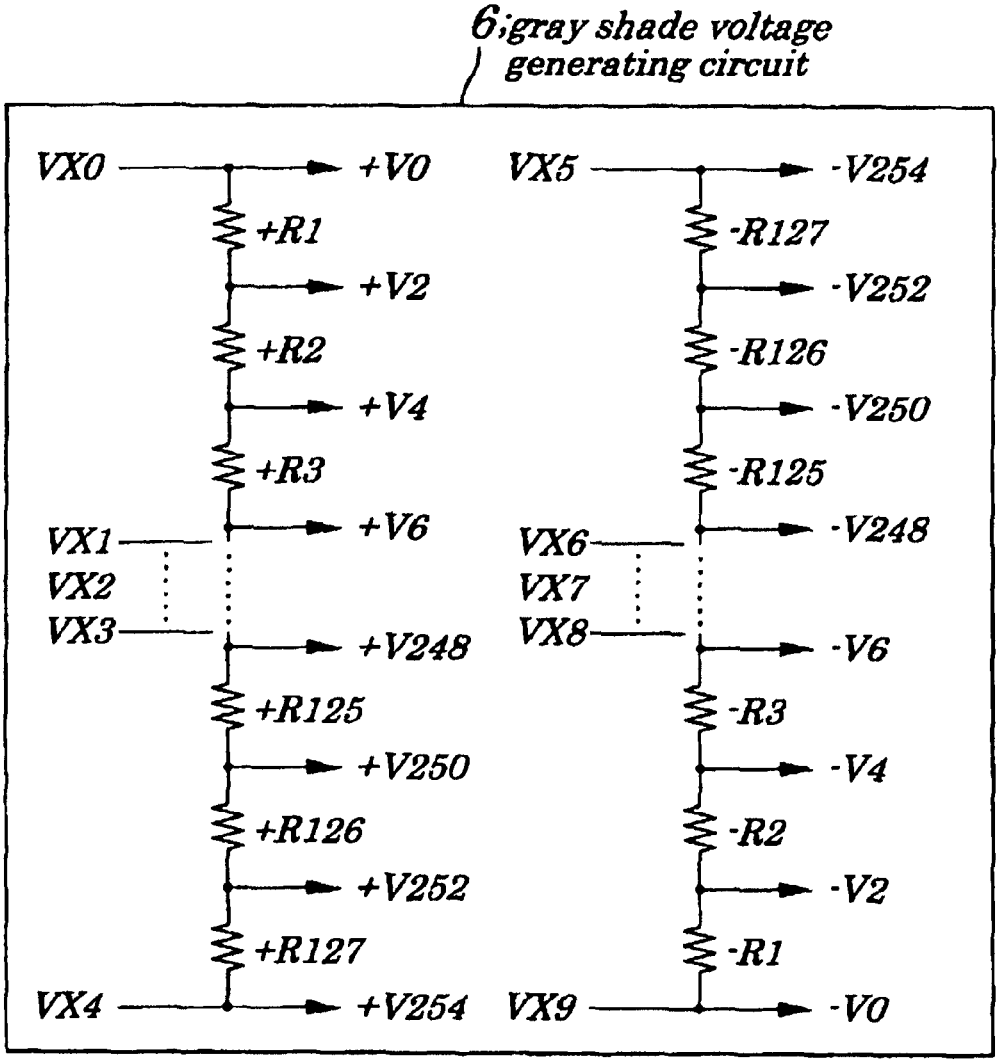
FIG. 2 is a schematic circuit diagram of a gray shade voltage generating circuit in the driving circuit of the first embodiment.

FIG. 2 is a schematic circuit diagram of the gray shade voltage generating circuit 6. As shown in FIG. 2, the gray shade voltage generating circuit 6 has 127 resistors +R1, +R2, +R3, . . . , +R125, +R126, +R127 connected in serial and 127 resistors −R1, −R2, −R3, . . . , −R125, −R126, −R127 connected in serial. A positive gray shade supply voltage VX0 is inputted to an end terminal of the resistor +R1 side and a positive gray shade voltage +V0 is outputted from this end terminal. A positive gray shade supply voltage VX4 is inputted to an end terminal of the resistor +R127 side and a positive gray shade voltage +V254 is outputted from this end terminal. Moreover, gray shade voltages from +V2 to +V252 are outputted from each connection point disposed between resistors, starting from the resistor +R1 side. The gray shade voltages from VX1 to VX3 are inputted to each connection point arbitrarily disposed between the resistor +R1 and the resistor +R127. A negative gray shade voltage VX5 is inputted to an end terminal of the resistor −R127 and the gray shade voltage −V254 is outputted from this end terminal. A negative gray shade voltage VX9 is inputted to an end terminal of a resistor −R1 side and a gray shade voltage −V0 is outputted from this end terminal. Negative gray shade voltages from −V2 to −V252 are outputted from each connection point between resistors, starting from the resistor −R1 side. The gray shade voltages from VX6 to VX8 are inputted to each connection point arbitrarily disposed between the resistor −R1 and the resistor −R127.

In the gray shade voltage generating circuit 6, the gray shade supply voltages from VX0 to VX4 is divided through the resistors from +R1 to +R127 to generate 128 positive gray shade voltages from +V0 to +V254. Similarly, the gray shade supply voltages from VX5 to VX9 is divided through the resistors from −R1 to −R127 to generate 128 negative gray shade voltages from −V0 to −V254. Therefore, the gray shades of 128×2 values are generated. Positive gray shade voltages of 128 values are supplied to the first gray shade voltage selecting circuit 7 and negative gray shade voltages of 128 values are supplied to the second gray shade voltage selecting circuit 8.

Figure 3A:
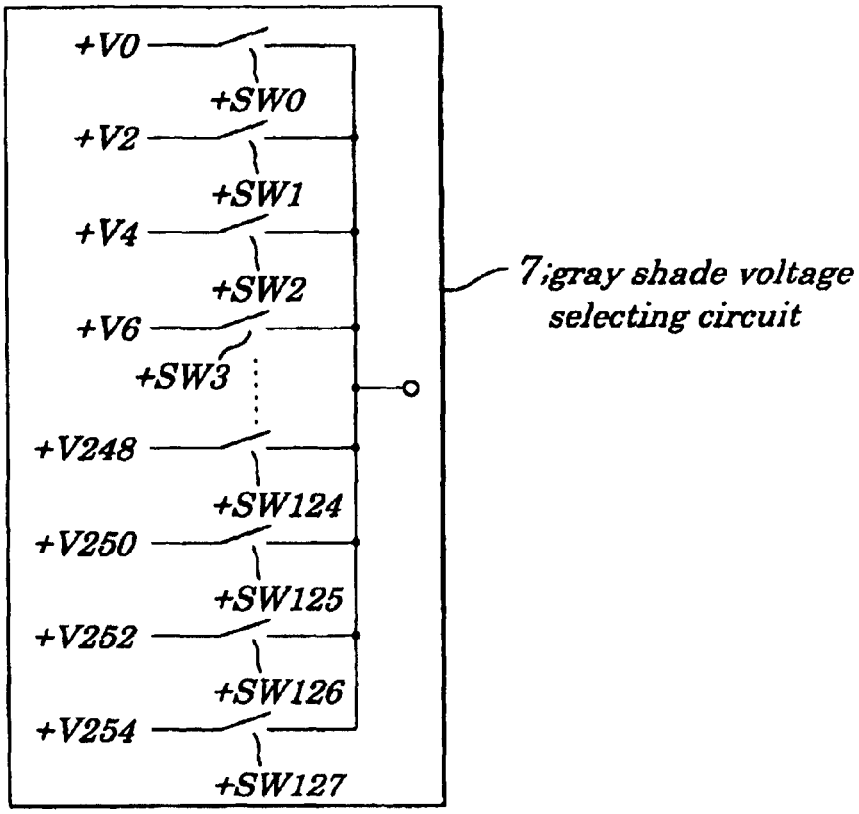
FIG. 3A is a schematic circuit diagram of a first gray shade voltage selecting circuit and FIG. 3B is a schematic circuit diagram of a second gray shade voltage selecting circuit.
Figure 3B:
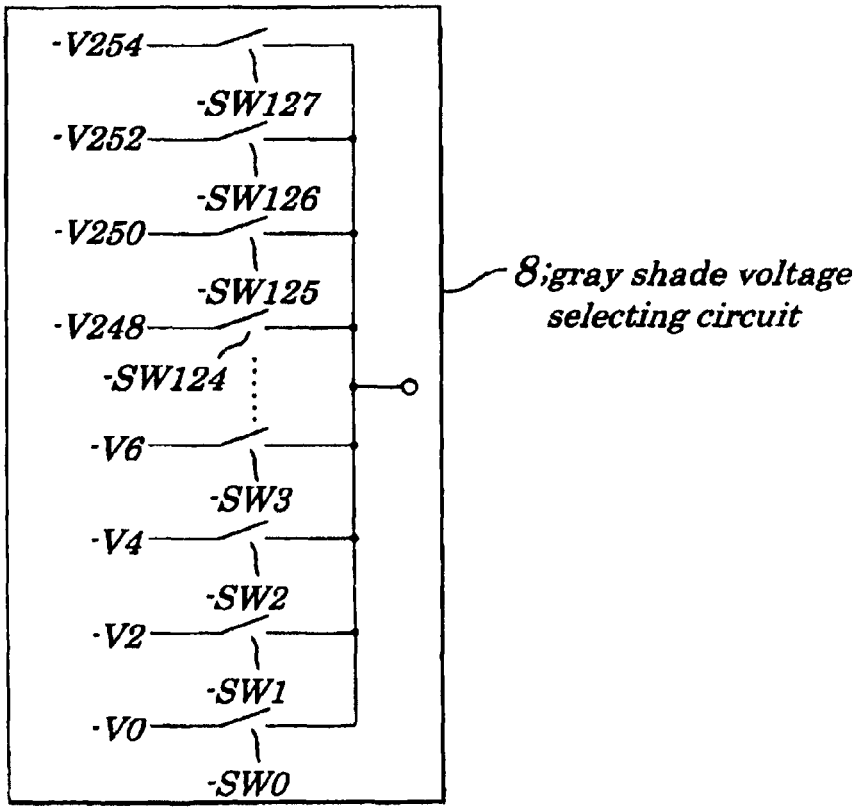

FIG. 3A is a schematic circuit diagram of a first gray shade voltage selecting circuit and FIG. 3B is a schematic circuit diagram of a second gray shade voltage selecting circuit. To an output terminal of the first gray shade voltage selecting circuit 7 is, in parallel, connected 128 switches from +SW0 to SW127. To each of switches from +SW0 to +SW127 is inputted each of gray shade voltage from +V0 to V254. One switch out of these switches +SW0 to SW127 is turned ON in accordance with high order 7 bits of the digital image data and one gray shade voltage is selected and outputted. That is, one gray shade value out of 128 gray shade values is selected and outputted. To an output terminal of the second gray shade voltage selecting circuit 8 are connected 128 switches from SW0 to SW127 in parallel. To each of the switches from SW0 to SW127 is inputted gray shade voltages −V0 to −V254. One of switches SW0 to SW127 is turned ON in accordance with high order 7 bits of the digital image data and one gray shade voltage is selected and outputted, i.e., one gray shade voltage out of 128 gray shade voltages is selected and outputted.

Figure 4:
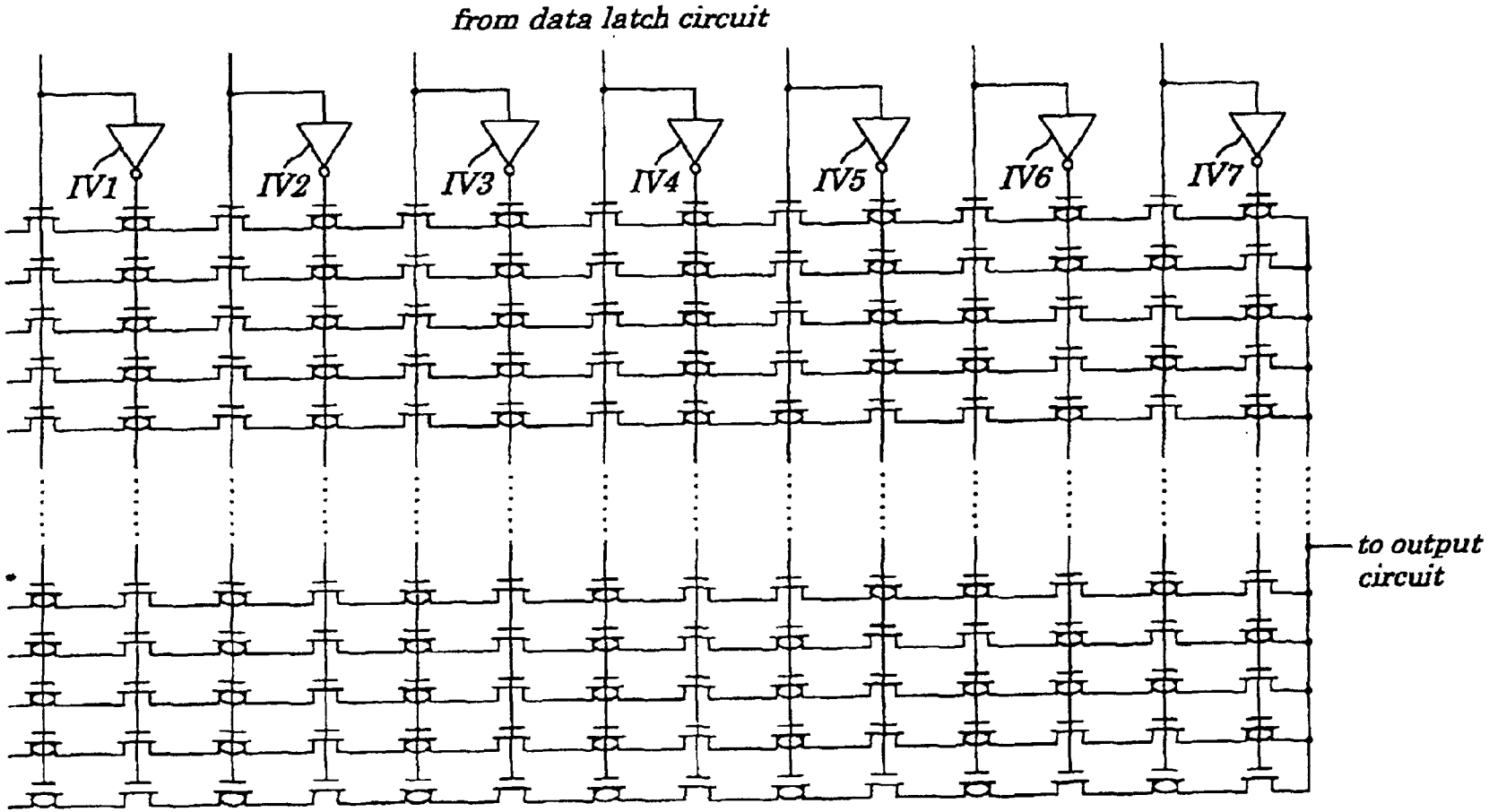
FIG. 4 is a schematic circuit diagram of switches for gray shade voltage selecting circuits.

FIG. 4 is a schematic circuit diagram of switches for gray shade voltage selecting circuits. The gray shade voltage selecting circuit is provided with transistors composed of, for example, 128 lines and 14 columns arranged in an array form. In FIG. 4, a transistor with an ellipse drawn in its channel portion is a depletion mode transistor and one without the ellipse drawn is an enhancement mode transistor. For example, in the 14th column from the left in FIG. 4, the depletion mode transistor and the enhancement mode transistor are alternately arranged in order and, in the 13th column, with each depletion mode transistor exchanged with each enhancement mode transistor compared with those in the 14th column, they are alternately arranged in order. Moreover, in the 12th column from the left in FIG. 4, two consecutive depletion mode transistors and two consecutive enhancement mode transistors are alternately arranged in order and, in the 11th column, with two consecutive depletion mode transistors exchanged with two consecutive enhancement transistors compared with those in the 12th column, they are alternately arranged in order. In the 10th column from the left, four consecutive depletion mode transistors and four consecutive enhancement mode transistors are alternately arranged in order. In the 8th column, eight consecutive depletion mode transistors and eight consecutive enhancement mode transistors are alternately arranged. In the 6th column, sixteen consecutive depletion mode transistors and sixteen consecutive enhancement mode transistors are alternately arranged as well. In the 4th column, thirty-two consecutive depletion mode transistors and thirty-two consecutive enhancement mode transistors are alternately arranged. In the 2nd column, sixty-four consecutive depletion mode transistors and sixty-four consecutive enhancement mode transistors are alternately arranged. In each column with an odd number, each of the depletion mode transistors is replaced with each of the enhancement mode transistors compared with each column with an even number.

Each gate of transistors mounted in columns with an even number is connected to inverters IV1 to IV7 and is further connected through these inverters IV1 to IV7 to each gate of transistors mounted in columns with an odd number and to data latch circuit 3. One bit digital image data is inputted to each of 7 pairs of even number and odd number columns.

By constructing switches of the gray shade voltage selecting circuit using such ROM-type decoders, a chip size can be made very small.

Moreover, when a voltage of higher voltage side relative to liquid crystal common voltages (i.e., potential of common electrode) is outputted, the ROM-type decoder is composed of P-channel enhancement mode transistors and P-channel depletion mode transistors and, when a voltage of lower voltage side relative to the liquid crystal common voltages (i.e., potential of common electrode) is outputted, the ROM-type decoder is composed of N-channel enhancement mode transistors and N-channel depletion mode transistors. In this embodiment, the former corresponds to the first gray shade voltage selecting circuit 7 and the latter corresponds to the second gray shade voltage selecting circuit 8.

Figure 5:
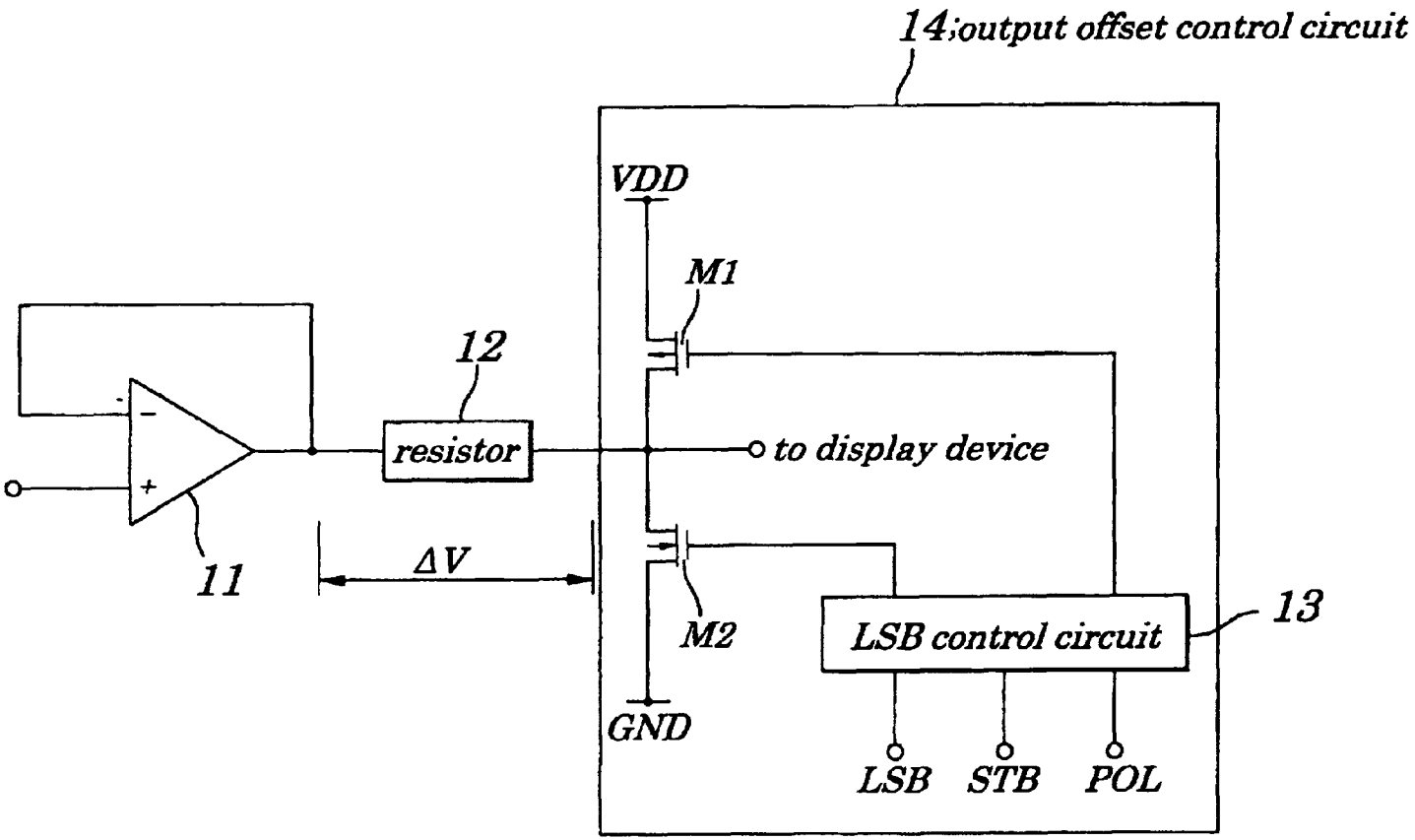
FIG. 5 is a schematic block diagram showing first and second output circuits shown in FIG. 1.

FIG. 5 is a schematic block diagram showing first and second output circuits shown in FIG. 1. Each of the output circuits is provided with an operational amplifier 11 used to amplify an output signal fed from the gray shade voltage selecting circuit and to convert its impedance. Between the operational amplifier 11 and an output terminal connected to the display device is connected a resistor 12 including an analog switch or the like. Between the resistor 12 and the output terminal are connected transistors M1 and M2 drains of which are connected to each other. A source of the transistor M1 is connected to a terminal of supply voltage VDD and a source of the transistor M2 is connected to a ground GND. Gates of the transistors M1 and M2 are connected to an LSB control circuit 13. To the LSB control circuit 13 are inputted the least significant bit (1 bit) of the digital image data and polarity signal POL and latch signal STB. That is, an output offset control circuit 14 is composed of transistors M1 and M2 and of the LSB control circuit 13.

The output circuit having configurations described above is controlled by the least significant bit of the digital image data. A voltage selected based on high order 7 bits of the digital image data is outputted as it is or after an offset voltage is added.

The transistors M1 and M2 are switched ON or OFF by the LSB control circuit 13 based on the least significant bit of the digital image data. When both of the transistors M1 and M2 are in an OFF state, though the output voltage from the operational amplifier 11 is applied, as it is, to a display device, when either of the transistors M1 or M2 is in an ON state, a steady state current of Im is generated which flows through the transistor M1 or M2 being in the ON state. If a resistance value of the resistor 12 including analog switches or the like is Rm, an offset voltage of $\Delta V = Im \times Rm$ is generated due to a voltage drop and this voltage is added to the output voltage from the operational amplifier 11 and the total voltage is applied to the display device from the output terminal. Moreover, the steady state current Im and the analog resistance Rm are set so that the voltage $\Delta V$ is one gray shade in a halftone region (i.e., during a region II in FIG. 7).

Operations of the driving circuit according to the first embodiment are described below (with reference to FIG. 1).

When the start pulse signal SP is inputted into the shift register circuit 1, 8-bit three outputs of digital image data including D00 to D07, D10 to D17 and D20 to D27 are sequentially stored in the data register circuit 2.

Next, when the latch signal STB is inputted into the data latch circuit 3 from the latch control circuit 5, all of the digital image data stored within the data register circuit 2 is transferred to the data latch circuit 3 and stored therein.

Moreover, 128 gray shade voltages obtainable by dividing 10 gray shade supply voltage VX0 to VX9 are supplied from the gray shade generating circuit 6 to the first gray shade selecting circuit 7 and the second gray shade selecting circuit 8. When the digital image data is transferred to the data latch circuit 3, one gray shade is selected, based on high order 7 bits of the digital image data, by the first gray shade voltage selecting circuit 7 from positive polarity 128 gray shade values. Similarly, one gray shade value is selected by the second gray shade voltage selecting circuit 8 from negative polarity 128 gray shade values.

If the TFT (Thin Film Transistor) liquid crystal display device is driven in dot reverse, when the polarity signal POL is 0 (low), a negative polarity voltage is inputted from the second gray shade voltage selecting circuit 8 to the first output circuit 9 and a positive polarity voltage is inputted from the first gray shade selecting circuit 7 to the second output circuit 10. On the other hand, if the polarity signal POL is 1 (high), a positive polarity voltage is inputted from the first gray shade voltage selecting circuit 7 to the first output circuit 9 and a negative polarity voltage is inputted to the second output circuit 10 from the second gray shade selecting circuit 8.

Figure 6:
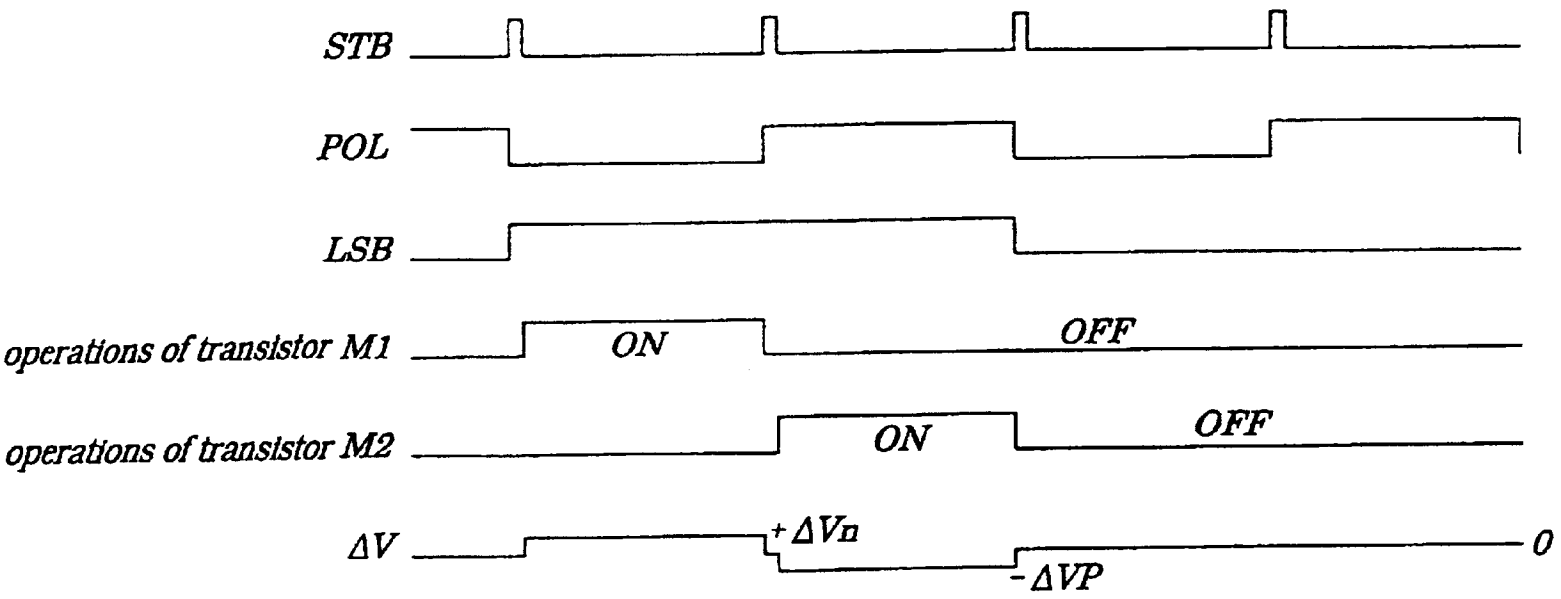
FIG. 6 is a time chart showing operations of a first output circuit 9 according to the first embodiment.

FIG. 6 is a time chart showing operations of the first output circuit 9 according to the first embodiment. In the first output circuit 9, if the least significant bit LSB is 0 (low), both of the transistors M1 and M2 are turned OFF regardless of the polarity signal POL. At this point, the voltage drop in the resistor 12 including analog switches or the like does not occur because currents do not flow constantly, an output voltage supplied from the operational amplifier 11, as it is, is applied to the display device from the output terminal.

On the other hand, if the least significant bit LSB is 1 (high), by the polarity signal POL, either of the transistor M1 or M2 is turned ON. That is, if the polarity signal POL is 0 (low), a negative polarity voltage from the second gray shade selecting circuit 8 is applied to the operational amplifier 11 of the first output circuit 9, the transistor M1 is turned ON and the transistor M2 remains OFF. Therefore, a steady state current Im1 flows through the transistor M1 and, since the supply voltage VDD is supplied to a source of the transistor M1, a voltage rise of $\Delta Vn = Im1 \times Rm$ occurs at the resistor 12.

Then, if the polarity signal POL becomes 1 (high) while the least significant bit LSB remains high, a positive polarity voltage fed by the first gray shade selecting circuit 7 is applied to the operational amplifier 11 of the first output circuit 9 and, at the same time, the transistor M1 is turned OFF while the transistor M2 is turned ON. Therefore, since the steady state current Im2 flows through the transistor M2 and the source of the transistor M2 is connected to a ground GND, a voltage drop $\Delta Vp = Im2 \times Rm$ occurs at the resistor 12.

The operation of the first output circuit 9 is described above, while the operation of the second output circuit 10 is the reverse of that of the first output circuit 9. For example, if the polarity signal POL is 0 (low) when the least significant bit LBS is 1 (high), a positive polarity voltage fed from the first gray shade voltage selecting circuit 7 is applied to the operational amplifier 11 of the second output circuit 10 and, at the same time, the transistor M2 is turned ON while the transistor M1 remains OFF. Therefore, since the steady state current Im2 flows through the transistor M2 and the source of the transistor M2 is connected to a ground GND, a voltage drop $\Delta Vp = Im2 \times Rm$ occurs at the resistor 12.

Thus, an impedance of a voltage outputted from the first gray shade voltage selecting circuit 7 and the second gray shade voltage selecting circuit 8 is converted by the operational amplifier 11 built in the output circuits 9 and 10 and is applied to the liquid crystal within the liquid crystal display device.

Accordingly, when the polarity signal POL is 0 (low), a negative polarity voltage is outputted from the first output circuit 9 and when the polarity signal POL is 1 (high), a positive polarity voltage is outputted from the same. On the other hand, a positive polarity voltage is outputted from the second output circuit 10 when the polarity signal POL is 0 (low), while a negative polarity voltage is outputted from the same when the polarity signal POL is 1 (high). The following table shows a relationship between the digital image data and output voltage.

TABLE 1

| Number of gray shades | Image data | Positive polarity | Negative polarity |
|---|---|---|---|
| 0 | 00 | +V0 | −V0 |
| 1 | 01 | $+V0-\Delta V_P$ | $-V0+\Delta V_N$ |
| 2 | 02 | +V2 | −V2 |
| 3 | 03 | $+V2-\Delta V_P$ | $-V2+\Delta V_N$ |
| . | . | . | . |
| . | . | . | . |
| . | . | . | . |
| 126 | 7E | +V126 | −V126 |
| 127 | 7F | $+V126-\Delta V_P$ | $-V126+\Delta V_N$ |
| 128 | 80 | +V128 | −V128 |
| 129 | 81 | $+V128-\Delta V_P$ | $-V128+\Delta V_N$ |
| . | . | . | . |
| . | . | . | . |
| . | . | . | . |
| 252 | FC | +V252 | −V252 |
| 253 | FD | $+V252-\Delta V_P$ | $-V252+\Delta V_N$ |
| 254 | FE | +V254 | −V254 |
| 255 | FF | $+V254-\Delta V_P$ | $-V254+\Delta V_N$ |

Figure 7:
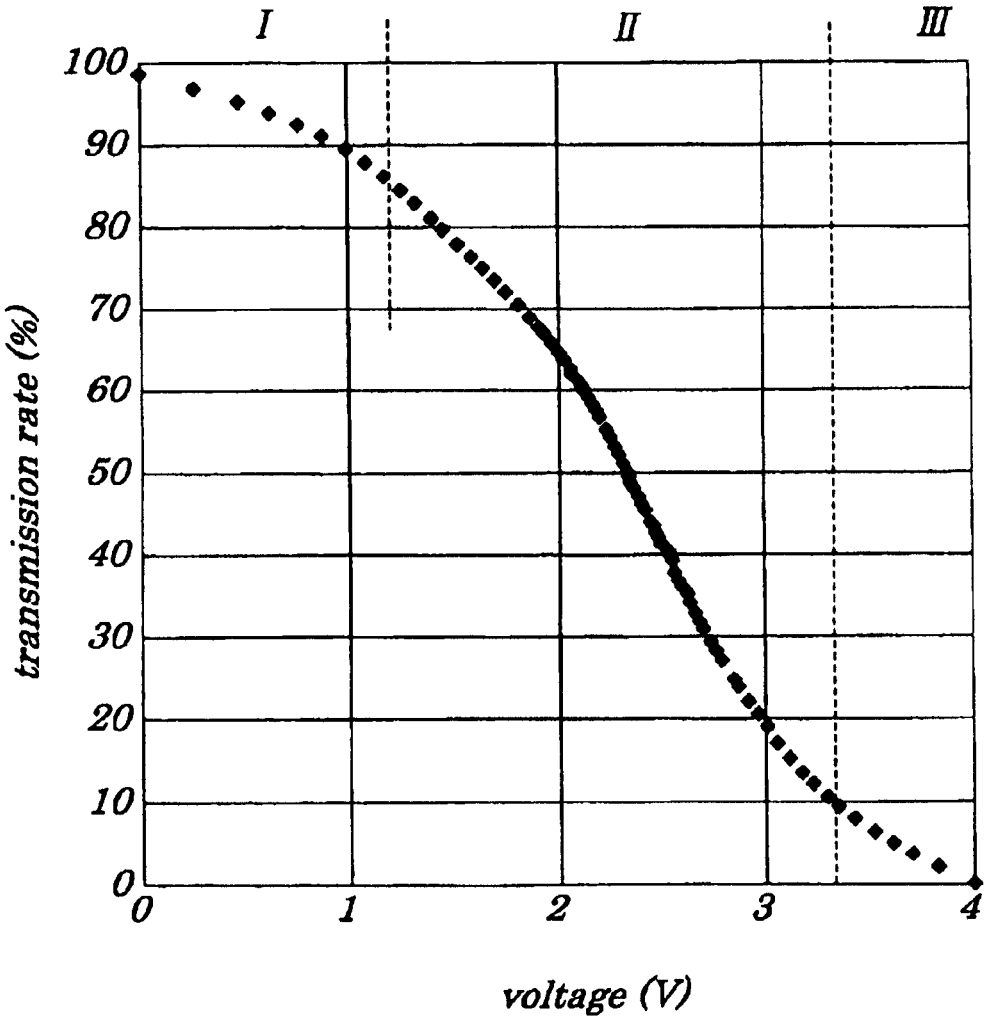
FIG. 7 is a graph showing a relationship between output voltage and transmission rate.
Figure 8A:
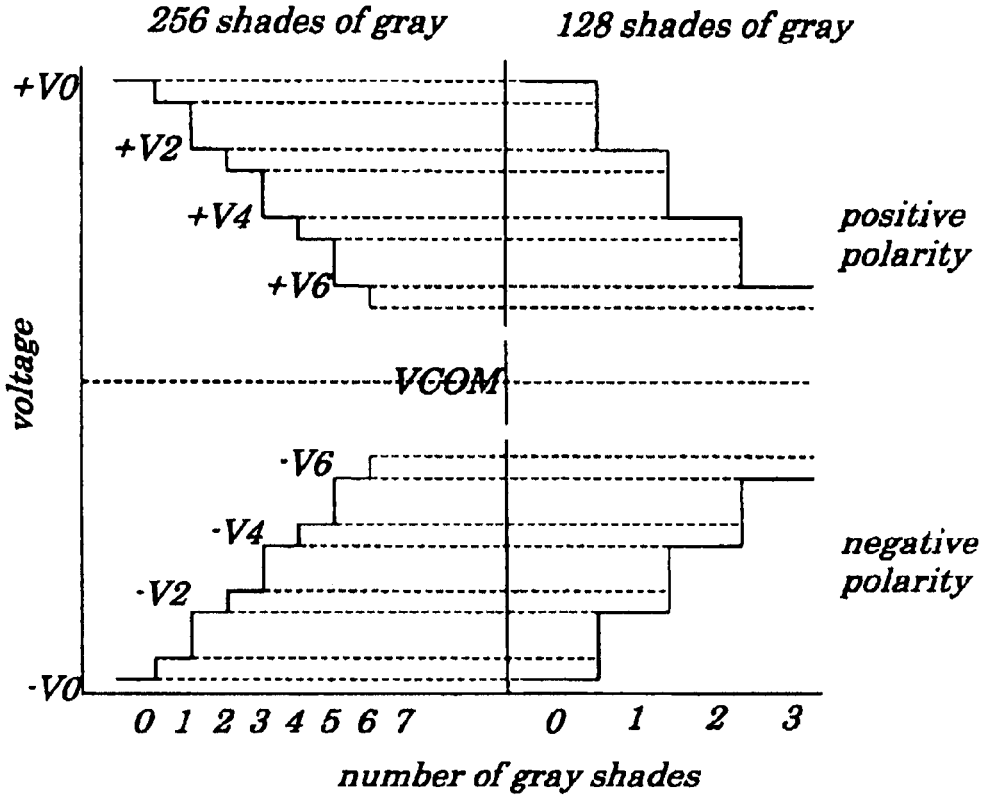
FIG. 8A is a graph showing a relationship between the number of gray shades and an output voltage at the time when a white color or black color is displayed on the liquid crystal display device in which the number of shades of gray is plotted as abscissa and the output voltage as ordinate and FIG. 8B is a graph showing a relationship between the number of gray shades and an output voltage at the time when an intermediate color (gray) is displayed on the liquid crystal display device in which the number of shades of gray is plotted as abscissa and the output voltage as ordinate.
Figure 8B:
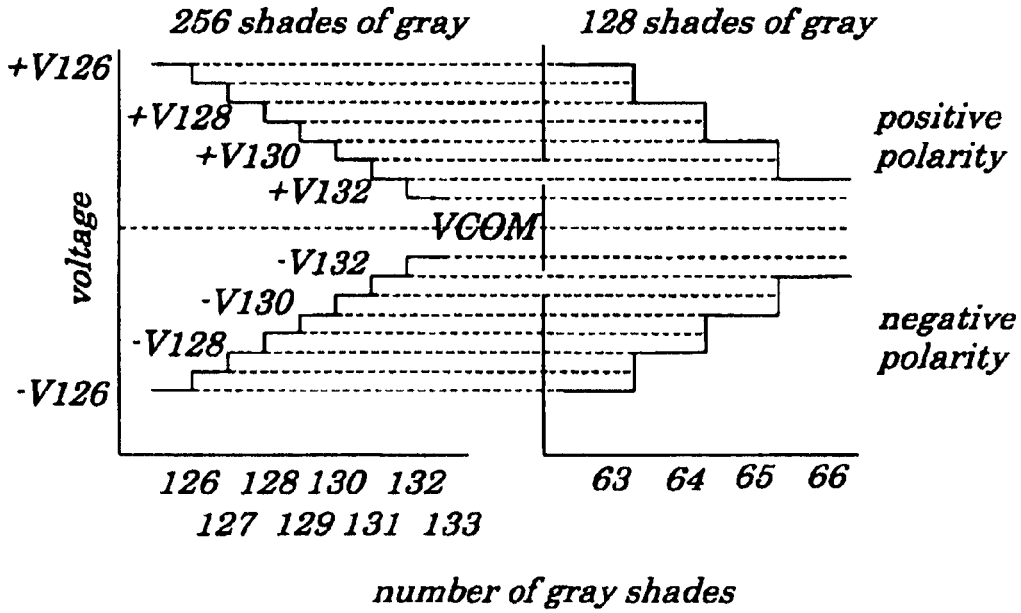

FIG. 7 is a graph showing a relationship between output voltage and transmission rate in which the output voltage is plotted as abscissa and the transmission rate as ordinate. FIG. 8A is a graph showing a relationship between the number of gray shades and an output voltage at the time when a white color or black color is displayed on the liquid crystal display device in which the number of shades of gray is plotted as abscissa and the output voltage as ordinate. FIG. 8B is a graph showing a relationship between the number of gray shades and an output voltage at the time when an intermediate color (gray) is displayed on the liquid crystal display device in which the number of shades of gray is plotted as abscissa and the output voltage as ordinate.

As shown in FIG. 7, the transmission rate decreases as the output voltage increases. As shown in Table 1, FIG. 8A and FIG. 8B, if the number of shades of gray is different, the output voltage is different. Therefore, as described in this embodiment, by dividing the digital image data into high order 7 bits and low order 1 bit and by applying the resistance string method to the high order 7 bits of the digital image data and applying an offset method to low order 1 bit of the digital image data, multi-gray shade display is made possible.

Thus, according to this embodiment, since the resistance string method is used for the high order 7 bits of the digital image data and the offset method for the low order 1 bit of the digital image data, the number of devices within the gray shade voltage selecting circuits 7 and 8 to be controlled by the high order 7 bits of the digital image data can be as small as 1792 (2×7×128). The number of devices of the LSB control circuit 13 to be controlled by the low order 1 bit can be as small as 30. On the other hand, in the conventional 8-bit resistance string method, 4096 (2×8×256) devices per one output are required for the gray shade voltage selecting circuit. The number of devices within the gray shade voltage selecting circuit can be decreased by 2304 and can be decreased by 2274 as a total when the number of devices of the LSB control circuits are taken into account. This enables the number of devices to be greatly decreased and the chip to be decreased in size.

Furthermore, in the conventional resistance string method, since it is necessary to check operations of 256 ROM decoders, 256 time functional tests are required. In contrast, according to this embodiment, since the resistance string method is applied to the high order 7 bits and the offset method to the low order 1 bit and, therefore, operations of 128 ROM decoders within the gray shade voltage selecting circuit must be checked, thus requiring the 128 time functional tests. In the case of the offset method applied to the low order 1 bit, since three time checking is necessary, at least 131 time functional tests must be performed. Thus, according to this embodiment, since the number of times of the testing can be much decreased, a great reduction in the costs of the testing is made possible.

Moreover, not only analog switches but also other diffusion resistors or polycrystal silicon resistors may be used for the resistor 12 in the embodiment.

Second Embodiment

Figure 9:
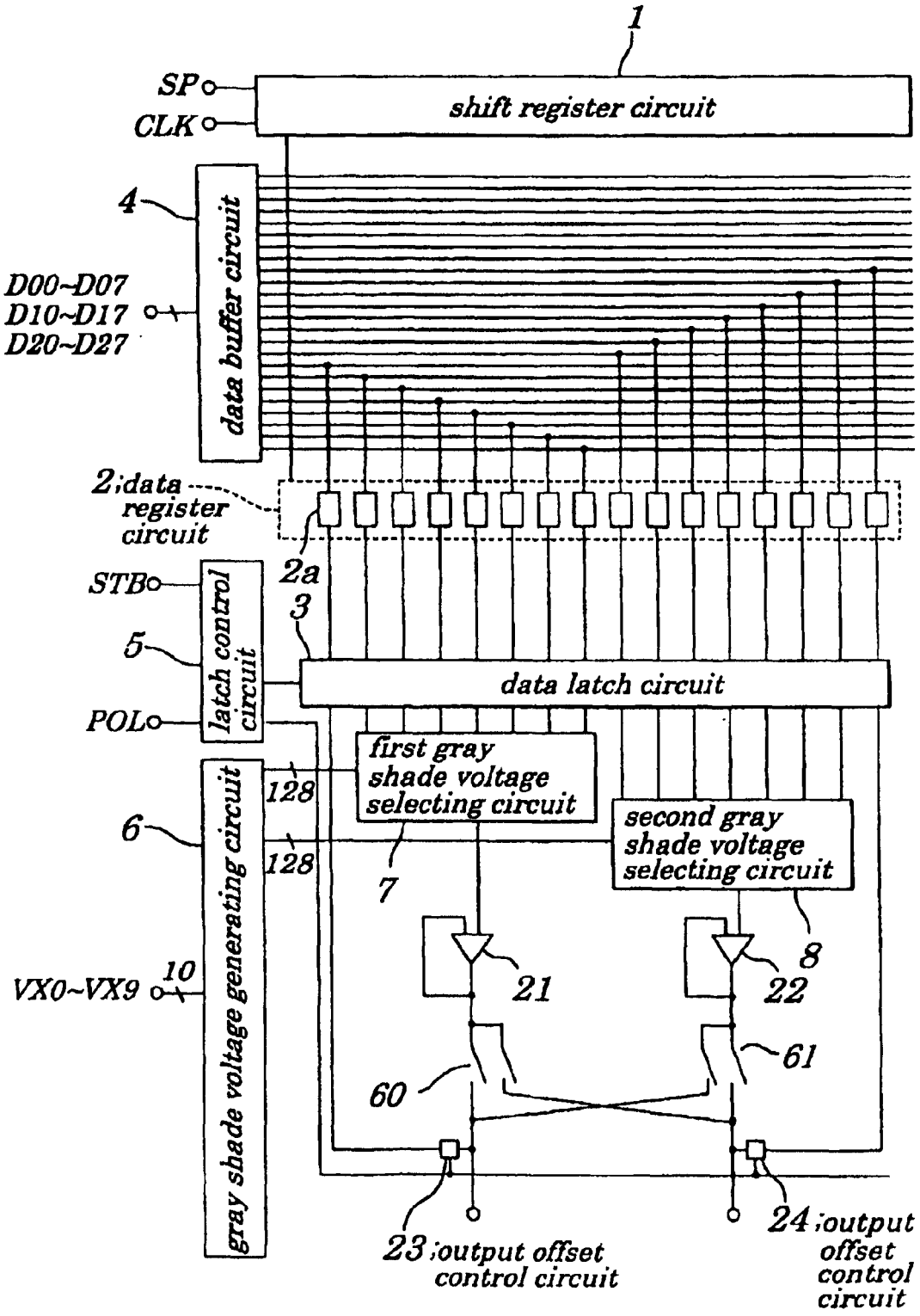
FIG. 9 is a schematic block diagram of a driving circuit according to a second embodiment.

FIG. 9 is a schematic block diagram of a driving circuit according to a second embodiment. Some reference numbers in FIG. 9 of the second embodiment designate corresponding parts in FIG. 1 of the first embodiment and their detailed descriptions are omitted.

According to the second embodiment, the driving circuit is provided additionally with an operational amplifier 21 connected to the positive polarity gray shade voltage selecting circuit 7 and an operational amplifier 22 connected to the negative polarity gray shade voltage selecting circuit 8. Moreover, to output terminals of the operational amplifiers 21 and 22 are connected output offset control circuits 23 and 24 through analog switched 60, 61. These output offset control circuits 23 and 24 have the same configurations as the output offset circuit 14 of the first embodiment. To these output offset control circuits 23 and 24 are connected output terminals to be connected to the display device such as TFT liquid crystal display panels or the like.

According to the second embodiment, analog switches 60, 61 used to make a switching between the first gray shade voltage selecting circuit 7 and the second gray shade voltage selecting circuit 8 and between the output offset control circuit 23 and 24 have the same function as the resistor 12 mounted within the output circuit of the first embodiment. That is, gray shades are adjusted by using a voltage rise or drop generated by the analog switches 60, 61. Because of this, in the first embodiment, any component that can be a resistance component may be the resistor 12, however, in the second embodiment, unless the component is an analog switch, the liquid crystal display device is not driven in dot reverse.

In the first embodiment, to produce an offset in the output voltage, an exclusive diffusion resistor or polycrystal silicon resistor is required. In contrast, in the second embodiment, since analog switches are connected to output terminals of the operational amplifiers 21 and 22, such exclusive resistors are not necessary, thus enabling circuits to be more simplified compared with the case of the first embodiment.

Third Embodiment

Figure 10:
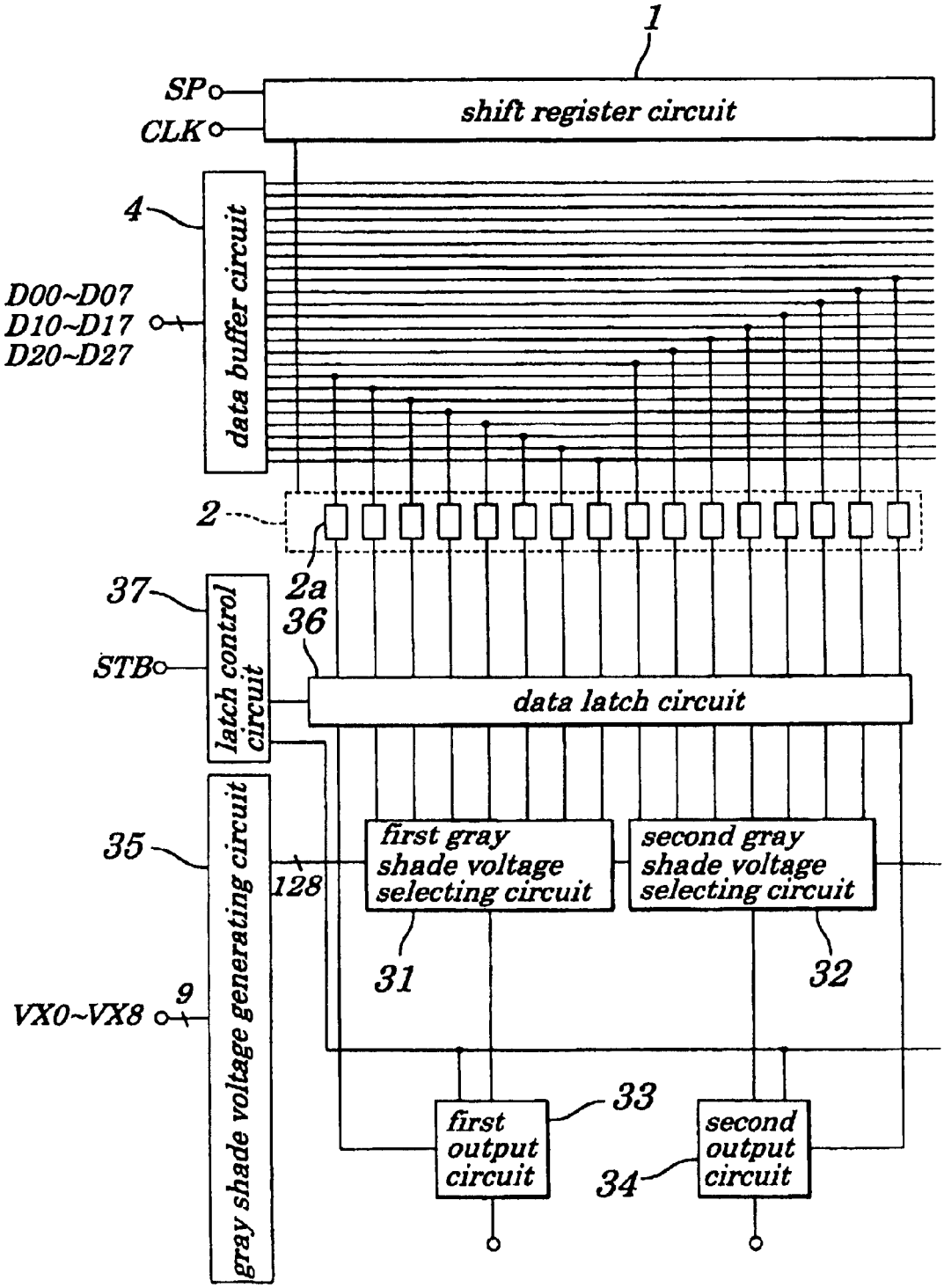
FIG. 10 is a schematic block diagram of a driving circuit according to a third embodiment.
Figure 11:
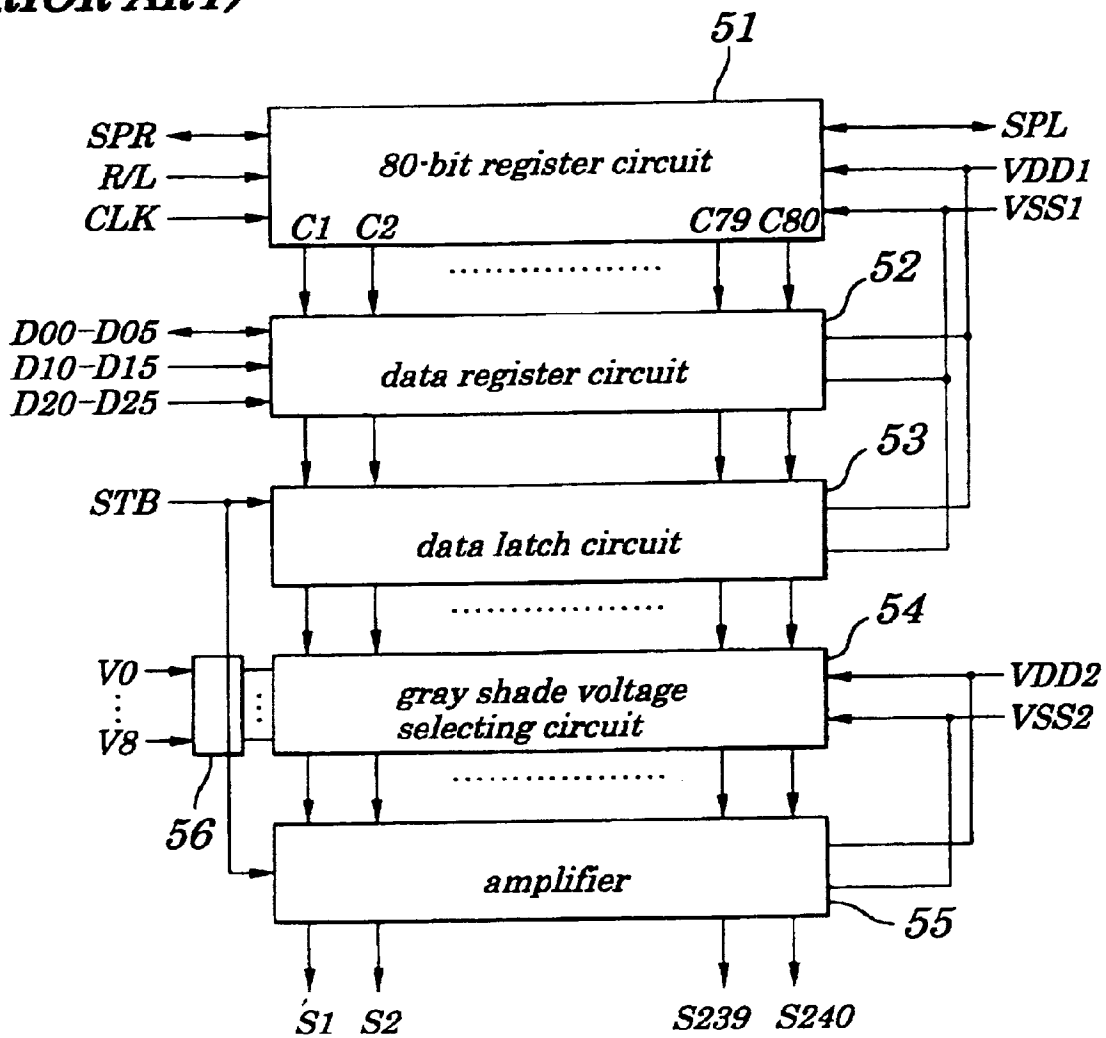
FIG.11 (PRIOR ART)
FIG. 11 is a schematic block diagram showing a conventional driving circuit used for a display device.

According to a third embodiment, a driving circuit for line reversion is provided. FIG. 10 is a schematic block diagram of a driving circuit according to the third embodiment. Same reference numbers in FIG. 9 of the second embodiment designate corresponding parts in FIG. 1 of the first embodiment and their detailed descriptions are omitted.

According to the third embodiment, the driving circuit is provided with a data latch circuit 36 adapted to latch digital image data and a latch control circuit 37 adapted to control operations of the data latch circuit 36. Since the driving circuit of this embodiment is used for the line reversion which does not require a polarity signal, to this latch control circuit 37 is inputted a latch signal STB only.

It also has a gray shade voltage generating circuit 35 used to divide gray shade voltages including 9 voltage values from V0 to V8 into 128 shades of gray having either of the positive or negative polarity and to output them. Though configurations of the gray shade voltage generating circuit 35 are the same as those shown in FIG. 2 of the first embodiment, according to this embodiment, a resistance string having either of positive or negative polarity is mounted thereon. From this gray shade voltage generating circuit 35 are generated gray shade voltages of 128 values.

Figure 12:
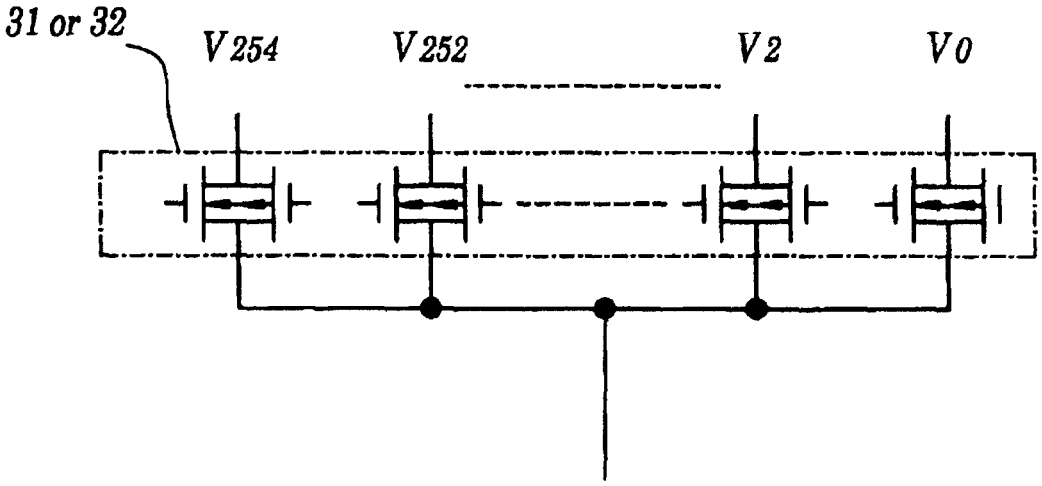
FIG. 12 is a schematic block diagram of an analog switch provided in gray shade voltage selecting circuit.

Moreover, the driving circuit of this embodiment is provided with a first gray shade voltage selecting circuit 31 and a second gray shade voltage selecting circuit 32 adapted to select one gray shade voltage out of 128 gray shade voltages outputted from the gray shade voltage generating circuit 35 based on the digital image data transferred to the data latch circuit 36. The first gray shade voltage selecting circuit 32 are provided with transfer-gate type analog switches composed of p-channel transistors and n-channel transistors as illustrated in FIG. 12. It also has a first output circuit 33 used to convert an impedance of a voltage outputted from the first gray shade selecting circuit 31 and a second output circuit 34 used to convert an impedance of a voltage outputted from the second gray shade selecting circuit 32. Configurations of the first output circuit 33 and the second output circuit 34 are the same as the output circuit in the first embodiment. However, to the LSB (Least Significant Bit) control circuit built in these circuits are inputted the least significant bit LSB of the digital image data and the latch signal STB only.

Thus, according to the third embodiment, both polarities can be selected by using the gray shade voltage selecting circuits 31 and 32 regardless of positive or negative polarities, the FTF liquid crystal panel is driven in line reverse.

Moreover, in the first to third embodiments, both the resistance string method and the method in which an offset is produced in output voltages are employed in all output voltages. However, as shown in FIG. 8A, during the areas I and III, it is difficult to obtain sufficient effects by such offset produced. Therefore, preferably, the 8-bit resistance string method only is applied during the areas I and III, while both the resistance string method and the method in which the offset is produced in output voltages are applied during the area II. That is, only the 8-bit resistance string method is applied during gray shades from 0 to 31 shades of gray (area I) and during gray shades from 224 to 255 shades of gray (area III). Moreover, during gray shades from 32 to 223 shades of gray (area II), both the 7-bit resistance string method and the method in which the offset is produced based on the least significant bit are employed.

Thus, the output voltage can be adjusted by setting the output signal fed from the gray shade voltage generating circuit to, for example, 160 (128+32), by inputting the least significant bit outputted from the data latch circuit to the gray shade voltage selecting circuit and by providing means for fixing 8-bit least significant bit to a low and high level based on digital image data.

The method for adjusting the voltage is not limited to the method in which the offset is produced for the voltage outputted from the operational amplifier described above. For example, a C-DAC (Switched Capacitor—DA converter) method in which a switched capacitor is mounted between the gray shade selecting circuit and the operational amplifier may be employed. In this case, the driving circuit may be so configured that only the resistance string method is employed depending on the digital image data.

As described above, according to the present invention, since the number of high order bits supplied to the gray shade voltage selecting circuit is smaller than that of the digital image data, the number of devices can be reduced when compared with the case where all bits of the digital image data are supplied. Moreover, since the low order bit is fed to the voltage adjusting means, the number of devices required is very small, thus enabling the chip area to be reduced and reducing the number of times of functional tests, resulting in cost reduction.

Furthermore, if the digital image data described above conforms to pre-determined data, by employing the resistance string method, it is made possible to display images having more proper shades of gray.

It is thus apparent that the present invention is not limited to the above embodiments but may be changed and modified without departing from the scope and spirit of the invention.

Finally, the present application claims the priority of Japanese Patent Application No. Hei11-037828 filed on Feb. 16, 1999, which is herein incorporated by reference.

What is claimed is:

1. A driving circuit of a display device for displaying a plurality of gray shades based on inputted digital image data comprising:

gray shade voltage generating means for generating a plurality of voltages;

gray shade voltage selecting means for selecting one voltage out of a plurality of voltages supplied from said gray shade voltage generating means based on high order bits composed of at least one bit counted from the most significant bit of said digital image data, and for outputting said voltage;

an operational amplifier used to amplify a voltage outputted from said gray shade voltage selecting means; and voltage adjusting means for inducing a voltage rise or a voltage drop of a voltage outputted from said operational amplifier based on low order bits of said digital image data.

2. The driving circuit of the display device according to claim 1, wherein said voltage adjusting means is comprised of a resistor, one end of which is connected to an output terminal of said operational amplifier, an active device connected to another end of said resistor and controlling means for controlling operations of said active device based on said low order bits of said digital image data, wherein said other end of said resistor is connected to said display device.

3. The driving circuit of the display device according to claim 1, wherein said active device has a first transistor, a drain of which is connected to said resistor, a source of which supply power is applied to and a gate voltage of which is controlled by said controlling means, and a second transistor a drain of which is connected to said resistor, a source of which is connected to a ground and a gate voltage of which is controlled by said controlling means.

4. The driving circuit of the display device according to claim 1, wherein said resistor is composed of an analog switch.

5. The driving circuit of the display device according to claim 1, wherein said gray shade voltage generating means is provided with two or more input terminals to which an voltage is inputted from outside and with dividing means used to divide voltages inputted into said input terminals into many voltages.

6. The driving circuit of the display device according to claim 1, wherein a voltage outputted from said gray shade voltage generating means is a positive polarity voltage and a negative polarity voltage.

7. The driving circuit of the display device according to claim 1, wherein, when bits of said digital image data are N, said high order bits are composed of (N−1) bits counted from the most significant bit of said digital image data and the low order bit is composed of one bit counted from the least significant bit of the digital image data.

8. A driving circuit of a display device for displaying a plurality of gray shades based on inputted digital image data comprising:

a gray shade voltage generating circuit for generating a plurality of voltages;

a gray shade voltage selecting circuit for selecting one voltage out of a plurality of voltages supplied from said gray shade voltage generating circuit based on high order bits composed of at least one bit counted from the most significant bit of said digital image data, and for outputting said voltage;

an operational amplifier used to amplify a voltage outputted from said gray shade voltage selecting circuit; and a voltage adjusting circuit for inducing a voltage rise or a voltage drop of a voltage outputted from said operational amplifier based on low order bits of said digital image data, wherein said voltage adjusting circuit is comprised of a resistor, one end of which is connected to an output terminal of said operational amplifier, an active device connected to another end of said resistor and controlling circuit for controlling operations of said active device based on said low order bits of said digital image data, wherein said other end of said resistor is connected to said display device.

9. The driving circuit of the display device according to claim 8, wherein said active device has a first transistor, a drain of which is connected to said another end of said resistor, a source of which supply power is applied to and a gate voltage of which is controlled by said controlling circuit, and a second transistor a drain of which is connected to said another end of said resistor, a source of which is connected to a ground and a gate voltage of which is controlled by said controlling circuit.

10. The driving circuit of the display device according to claim 8, wherein said resistor is composed of an analog switch.

11. The driving circuit of the display device according to claim 8, wherein a voltage outputted from said gray shade voltage generating circuit is a positive polarity voltage and a negative polarity voltage.

12. The driving circuit of the display device according to claim 1, wherein, when bits of said digital image data are N, said high order bits are composed of (N−1) bits counted from the most significant bit of said digital image data and the low order bit is composed of one bit counted from the least significant bit of the digital image data.

*13. A driver for driving a display device in response to a plurality of input data, each of said input data comprising a plurality of bits, said driving circuit comprising:*

*a gray shade voltage generating circuit generating a plurality of gray shade voltages, the number of said gray shade voltages being determined by the number of said bits of said input data, said gray shade voltages being divided into first and second groups of gray shade voltages, said first group of gray shade voltages being generated by a resistance string circuit and said second group of gray shade voltages being generated based on at least two different ones of first group of gray shade voltages; and*

*a plurality of output terminals coupled to said display device, each of said output terminal being provided for an associated one of said input data and to supply said display device with one of said gray shade voltages responsive to information of the associated one of said input data.*

*14. The driver as claimed in claim 13, wherein said output terminal outputs one of said first group of gray shade voltages when said display device is driven with a first input data corresponding to a halftone region.*

*15. The driver as claimed in claim 14, wherein said output terminal outputs one of said second group of gray shade voltages when said display device is driven with a second input data corresponding to said halftone region.*

*16. The driver as claimed in claim 15, wherein said output terminal outputs one of said first group of gray shade voltages when said display device is driven with a third input data corresponding to a non-halftone region.*

*17. A driver for driving a display device in response to a plurality of input data, comprising:*

*a gray shade voltage generator for generating a plurality of gray shade voltages;*

*a gray shade voltage selector, selecting without a voltage up or a voltage drop, a first one of said gray shade voltages when said display is driven with a first input data corresponding to a non-halftone region, selecting without a voltage up or a voltage drop, a second one of said gray shade voltages when said display is driven with a second input data corresponding to a halftone region, and selecting a voltage generated by a voltage up or a voltage drop of said second one of said gray shade voltages when said display is driven with a third input data corresponding to said halftone region; and*

*an amplifier amplifying a voltage outputted from said gray shade voltage selector.*

*18. The driver as claimed in claim 17, wherein said voltage generated by said voltage up or said voltage drop is generated by dividing according to said second one of said gray shade voltages and a voltage different from said second one.*

* * * * *